Figures 1, 2, 3:
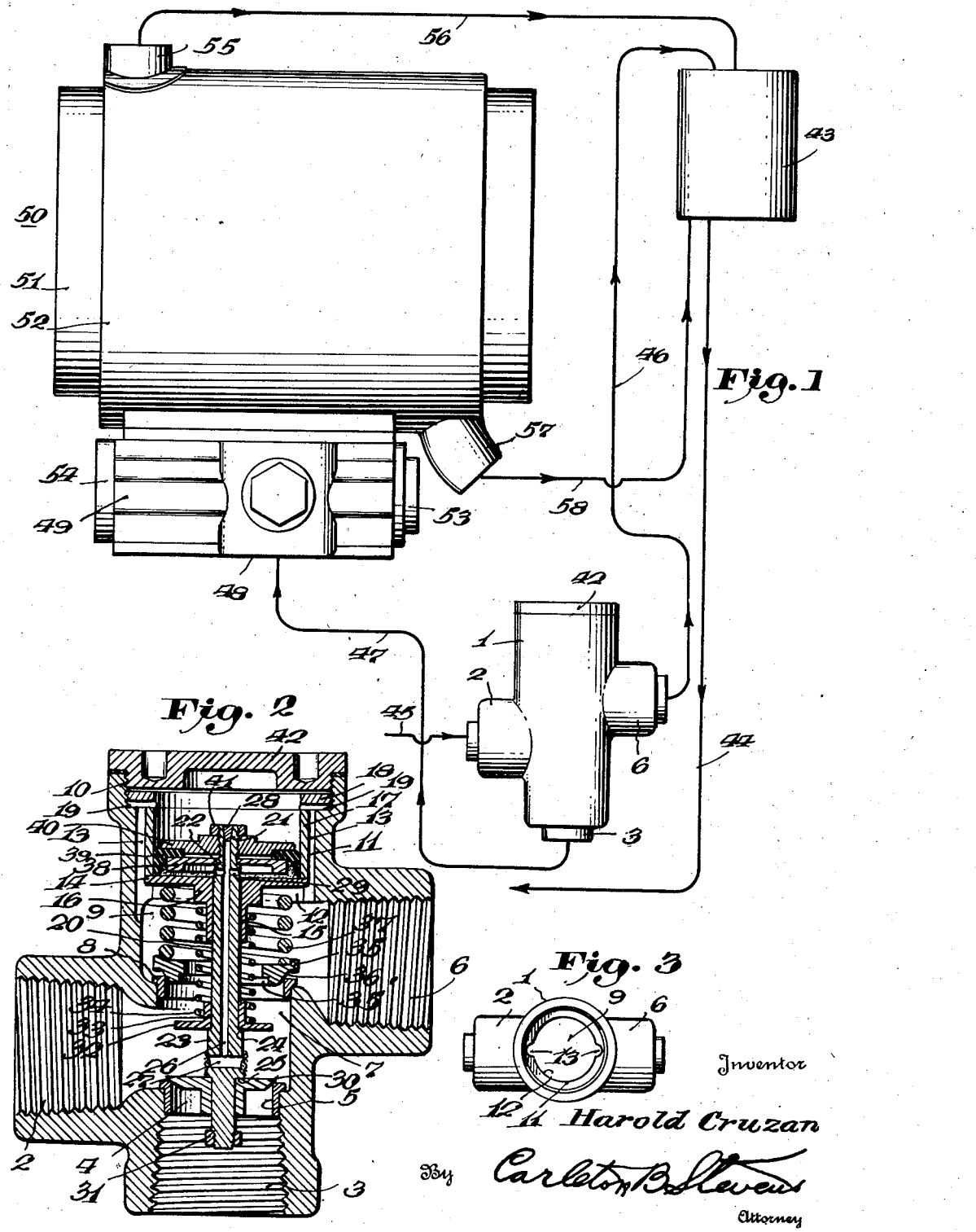

Jan. 1, 1946.  H. CRUZAN  2,392,214
BY-PASS CONTROL VALVE
Filed Dec. 26, 1942

Inventor
Harold Cruzan
By Carleton B. Stevens
Attorney

Patented Jan. 1, 1946

2,392,214

UNITED STATES PATENT OFFICE 2,392,214

BY-PASS CONTROL VALVE

Harold Cruzan, Dayton, Ohio, assignor to United Aircraft Products, Inc., Dayton, Ohio, a corporation of Ohio Application December 26, 1942, Serial No. 470,258

15 Claims. (Cl. 137—153)

This invention relates to a by-pass fluid flow control valve, and pertains more particularly to a device for controlling surge pressures in a fluid circulatory system, such as shown in my prior application, Serial No. 445,601, filed June 3, 1942, wherein a lubricant is circulated under pressure through a heat exchanger or temperature and viscosity conditioning unit by a pump or analogous pressure producing means.

While the control valve is hereinafter shown and described as being applied to a lubricant circulating and conditioning system of an airplane engine it will be readily apparent and understood that same is not restricted to such use, but is equally applicable to similar power units when used in connection with fluid circulatory systems wherein a similar problem is involved.

The lubricant circulating and conditioning systems in use with airplane engines at the present time, generally include a pressure pump disposed in the line leading from an oil reservoir to the engine and a scavenge pump and heat exchange unit in the return line from the engine back to the reservoir. The scavenge pump is located ahead of the heat exchange unit and the latter functions to control the temperature and thereby the viscosity of the oil being returned to the reservoir and thence to the engine.

Ordinarily, when the engine is initially started the lubricant in the various conduits and heat exchange unit is usually more viscous than desired for efficient operation of the lubrication system. Consequently, high pressure is needed to force the lubricant through the flow lines and heat exchange unit to the vital parts of the engine which require uniform and constant lubrication. Thus it will be appreciated that, under the foregoing conditions, an almost instantaneous high pressure on the oil lines and heat exchange unit will result immediately upon starting the engine and scavenge pump with consequent possibility of damage to the system and particularly to the heat exchange unit by bulging or collapsing the shell and/or tubes of the latter or rupturing the lines.

Therefore, the primary important object of this invention is to provide a device of the above character which will entirely eliminate the possibility of excessive or surge pressure, generated by the scavenge pump, being exerted on the heat exchange unit so as to protect the latter from damage which may result therefrom.

Another important object of this invention is to provide an automatic valve of the above character which will prevent damage to the lubricating system resulting from excessive pressure built up by the scavenge pump under actual flight conditions, for example in instances where the motor and thereby the lubricating system is temporarily cut out at high altitudes or in power dives, such conditions usually resulting in rapidly increasing the viscosity of the lubricant, and in some instances congealing the latter.

Another important object of this invention is to provide a control of the above character which will automatically function to by-pass the lubricant around the heat exchange unit directly to the reservoir in the event the viscosity of the lubricant is such that same will not readily flow through the heat exchange unit under the normal pressure generated by the scavenge pump.

Another important object of this invention is to provide a control valve of the above character which will automatically function to by-pass the lubricant around the heat exchange unit to the reservoir in the event that flow through the heat exchange unit is prevented by an obstruction therein or in the circulatory system between said valve and said unit or between the latter and the reservoir.

A still further important object of this invention is to provide a by-pass control valve which is of simple construction, efficient in operation and one which may be readily manufactured and placed upon the market at a reasonable cost.

The foregoing and other important objects and advantages will be readily apparent throughout the course of the following detailed description and drawing, wherein like reference characters indicate like parts, and in which:

Figure 1 is a diagrammatic disclosure of one type of lubrication system with the by-pass control valve forming the subject matter of this application installed therein, and with the engine and pumps removed, Figure 2 is a vertical cross-section of the by-pass control valve shown in elevation in Figure 1, and Figure 3 is a top plan view of the control valve on a reduced scale, with the closure and valve mechanism removed.

Referring in detail to the by-pass control valve, 1 indicates a hollow body or casing of substantially cruciform configuration, provided with an inlet port 2 and a main outlet port 3 connected by a right-angled passage 4 having a valve seat 5 therein. The body 1 is also provided with a by-pass outlet port 6 connected with the inlet port 2 by a passage 7 having a valve seat 8 therein disposed in vertical alinement with the valve seat 5.

The hollow body 1 is further formed with a vertically extending branch passage 9 in vertical alinement with the valve seats 5 and 6 and has its open upper end internally threaded as at 10.

The passage 9 above the by-pass outlet 6 is reduced as at 11 and such reduced portion is formed at its lower end with an inwardly extending flange 12. The reduced portion and the flange is further formed with diametrically opposed and vertically extending grooves 13 to provide a pair of fluid flow passages.

Disposed within the reduced portion 11 and engaging the flange 12, so as to be supported thereby, is a disk 14 having a central opening therethrough. Formed integral with the disk and depending therefrom in axial alinement with the central opening, is a sleeve 15, the inner and outer surfaces of which provide bearings or guides. Adjacent its upper end at the point of connection with the disk 14, the sleeve 15 is formed with an enlargement or collar 16.

Fitting snugly within the reduced portion 11, is a cylinder 17 which has its lower end seated upon the disk 14 and its upper end terminating substantially flush with the upper end of said reduced portion, the disk 14 forming a bottom for the cylinder.

A locking ring 18 is threaded into the upper end of the branch passage 9 and has its lower face engaging the upper end of the cylinder 17 so as to securely hold the disk 14 upon the flange 12. The lower face of the locking ring 18 is provided with a pair of opposed radially extending and downwardly facing grooves 19 to provide horizontal fluid passages connecting the fluid passages 13 with the interior of the cylinder 17.

Slidably mounted within the sleeve 15 is a stem or rod 20 having a reduced upper end 21 providing a shoulder 22 and an intermediate enlarged portion 23 adjacent the lower end thereof, providing an upwardly facing shoulder 24 and a downwardly facing shoulder 25.

The rod 20 is provided with an axially extending passage or friction tube 26 which has its lower end communicating with an enlarged transversely extending screened passage 27, located between the shoulders 24 and 25 formed by the enlarged portion 23 and opening into the inlet passage 2 of the valve body while the upper end of said axially extending passage 26 is closed by a plug 28 or other suitable means.

The axially extending passage 26 further communicates at a point adjacent its upper end with a second but smaller transverse passage 29 opening into the cylinder 17.

Slidably mounted upon the lower end of the rod 20 is a valve 30 which is adapted to engage the valve seat 5 during certain phases of the operation of the device. The valve 30 is retained against vertical separation from the rod 20 by means of a threaded nut 31 or other suitable fastening means, which latter also acts to engage and thereby unseat or open valve 30, as will be later described.

Mounted upon the rod 20, for sliding movement toward and away from the upwardly facing shoulder 24, is a disk valve 32 formed with an upstanding integral collar 33 which together with the depending sleeve 15 acts to position and guide a coiled compression spring 34 between disk 14 and disk valve 32 for normally holding the disk valve 32 against said shoulder 24, and thereby to assist in holding the valve 30 upon its seat.

Also disposed in spaced relation about the rod 20 and coiled spring 34 is a ring valve 35 having an outer tapered seat 36 formed for engagement with valve seat 8. The ring valve 35 is further formed with an inner downwardly facing seat 35' to receive the disk valve 32 during certain phases in the operation of the device. The ring valve 35 is normally held in engagement with valve seat 8 by means of a second coiled compression spring 37, of larger diameter than spring 34, positioned between and contacting the disk 14 and the upper face of the ring valve, the stored energy of the spring 37 being relatively greater than that possessed by the spring 34.

Mounted upon the reduced upper end 21 of the rod 20, above the transverse passage 29, for reciprocating movement within the cylinder 17, is a piston head composed of a lower plate 38, an intermediate cup type packing 39, and an upper plate 40, all of which elements are clamped together against the shoulder 22 by means of a nut 41 having threaded engagement with the upper end of said rod.

The upper end of the vertically extending branch passage 9 of the valve body above the cylinder 17 is sealed by means of a removable cap or closure 42.

At this point it is to be particularly noted that the pressure of the spring 34, which through disk valve 32 and shoulder 24 assists in holding valve 30 upon seat 5, is further periodically augmented during certain phases of the operation by fluid pressure acting against the top of the piston head, such fluid pressure being by-passed from the outlet side of valves 32 and 35 through the passages 13 and 19 into the top of the cylinder 17.

Referring to the diagrammatic disclosure of Figure 1, 43 indicates a lubricant or oil reservoir having communication through conduit 44 with a pressure pump and engine respectively, not shown. The oil after leaving the engine is then forced by a scavenge pump not shown, through conduit 45 into the inlet 2 of by-pass control valve body 1.

The by-pass outlet 6 of the valve body 1 is connected to reservoir 43 by conduit 46, while the main outlet port 3 is connected by conduit 47 with the inlet passage 48 of an oil viscosity controlled member 49 carried by an oil heat exchange unit indicated generally at 50. The oil heat exchange unit is provided with a radiator 51 surrounded by a warming jacket 52.

The inlet passage 48 of the viscosity controlled member 49 leads to each of a pair of pressure valves 53 and 54 which control the inlet of oil to the warming jacket and radiator respectively, depending upon the viscosity of the oil in the radiator 51.

The radiator 51 is provided with an outlet 55 connected to the reservoir by conduit 56, while the outlet 57 of the warming jacket 52 also communicates with the reservoir through a conduit 58.

While the construction and operation of the heat exchange unit, per se, forms no part of the present invention, its inclusion in the combination or system diagrammatically disclosed in Figure 1 is a part of the present invention. Therefore, a brief description of the operation of the heat exchange unit is deemed necessary in order to fully explain the entire system and/or the by-pass control valve shown in detail in Figure 2 of the drawing.

Accordingly, the heat exchange unit and parts will be a pressure differential between the inlet and by-pass equal to the resistance of spring 37 to opening of the valve 35. As the pressure in the by-pass becomes lower, the effect of such by-pass pressure on the top of the piston in the cylinder 17 likewise becomes lower until the combined effect of such by-pass pressure and the inlet pressure on top of the valve 30 is less than the upward effect of the inlet pressure on the under side of the piston in the cylinder 17 through the friction tube 26 whereupon the piston in the cylinder 17 will move upwardly to lift the valve 30 from its seat and open the outlet 3 to the heat exchange unit 50. The parts are so arranged and so operate that the valve 30 will not be lifted from its seat until the inlet pressure is less than a predetermined value which will not have a destructive effect on the heat exchange unit, and after such valve 30 is opened the pressure to which the heat exchange unit may be subjected is limited by the resistance value of the spring 37 to opening of the annular or ring valve 35 controlling flow to the tank 43 through the by-pass outlet 6 and conduit 46, it being understood that the annular or ring valve 35 remains in effect a solid valve due to the disc valve 32 being held in upwardmost position by the shoulder 24 on the stem 23 when the valve 30 is open.

The temperature of the oil in the system will continue to rise under the effect of heat imparted to it by the engine and the viscosity of the oil will become correspondingly lower. Pressure necessary to flow the oil through the heat exchange unit 50 is less than that necessary to open the valve 35 against resistance of the spring 37, whereby the inlet pressure will continue to decrease due to lesser resistance to flow and the valve 35 will be moved to closed position. However, the compression value of the spring 34 is such that it will be overcome by even the lesser inlet pressure whereby the valve 30 will be held open by the effect of the inlet pressure on the under side of the piston 17 through the friction tube 26 until the engine and scavenge pump cease to operate. Then, the spring 34 will move the valve 30 to closed position and upon starting the engine the foregoing cycle of operations will be repeated.

It will be readily apparent from the foregoing that regardless of the type of heat exchange unit used in a lubricating system the by-pass control valve or unit will automatically function to prevent the application of damaging pressures to said heat exchange unit or other parts to be protected.

It is to be understood that the form of my invention shown and described is to be taken as only one example of the same and that various changes in the shape, size and arrangement of parts may be resorted to without departing from the operation of my invention or the scope of the subjoined claims.

What is claimed is:

1. A valve of the character described comprising a casing having an inlet and main and by-pass outlets, said casing also including a cylinder, a piston in said cylinder, a first valve controlling said main outlet, a connection between said first valve and said piston whereby the former actuates the latter, a ring valve between said inlet and said by-pass outlet closing toward the former, yieldable means tending constantly to close said ring valve, a disk valve at the inlet side of said ring valve normally spaced from the latter and movable toward a position closing said ring valve against flow of fluid therethrough by flow of fluid from said inlet through said ring valve to said by-pass outlet, thereby to cause an increased pressure of the fluid in said inlet, means providing communication between said inlet and said cylinder at one side of said piston and between said by-pass outlet and said cylinder at the other side of said piston whereby said piston is moved in response to the difference in the pressure of the fluid in said inlet and in said by-pass outlet to open said first valve and establish communication between said inlet and said main outlet.

2. A valve of the character described comprising a casing having an inlet and main and by-pass outlets, a first valve normally closing said main outlet, a second valve operable by flow of fluid from said inlet to said by-pass outlet to restrict such flow thus to cause a reduced pressure of the fluid in said by-pass outlet as compared with the pressure of the fluid in said inlet, and means operable by the difference between the pressure of the fluid in said inlet and in said by-pass outlet to open said first valve and thereby establish communication between said inlet and said main outlet.

3. A valve of the character described comprising a casing having an inlet and main and by-pass outlets, a first valve normally closing said main outlet, a ring-valve between said inlet and said by-pass outlet closing toward the former, yieldable means tending constantly to close said ring valve, a third valve at the inlet side of said ring valve normally spaced therefrom and movable toward a position closing the same against flow of fluid therethrough by flow of the fluid from said inlet through said ring valve to said by-pass outlet, thereby to cause a reduced pressure of the fluid in said by-pass outlet as compared with the pressure of the fluid in said inlet, and means operable by the difference between the pressure of the fluid in said inlet and in said by-pass outlet to open said first valve and thereby establish communication between said inlet and said main outlet.

4. A valve of the character described comprising a casing having an inlet and main and by-pass outlets, said casing also including a cylinder, a piston in said cylinder, a first valve controlling said main outlet, a stem connecting said piston with said first valve, said stem having a duct therein providing communication between said inlet and said cylinder to one side of said piston, means providing communication between said by-pass outlet and said cylinder to the other side of said piston, and a second valve operable by flow of fluid from said inlet to said by-pass outlet to restrict such flow thus to cause a reduced pressure of the fluid in said by-pass outlet as compared with the pressure of the fluid in said inlet and consequent movement of said piston in said cylinder, the said movement of said piston being effective to open said first valve and thereby establish communication between said inlet and said main outlet.

5. A valve of the character described comprising a casing having an inlet and main and by-pass outlets, a first valve normally closing said main outlet, a second normally open valve between said inlet and said by-pass outlet movable by flow of fluid from said inlet to said by-pass outlet toward a closed position denying such flow thus to cause a reduced pressure of the fluid in said by-pass outlet as compared with the pressure of the fluid in said inlet, yieldable means thereof, not shown in detail, but generally described, functions as follows:

A heat exchange unit of the type described is disposed in the lubricant circulating system between the reservoir and the scavenge pump so that the oil from the engine will be forced through the unit and thence into the reservoir. Assuming that the engine is put in operation from a cold start and that the oil in the radiator 51 is viscous or congealed, same will enter the unit at 48, where it will then be by-passed through valve 53, warming jacket 52, outlet 57 and through conduit 58 into the reservoir.

However, as the viscosity of the oil in the radiator 51 lowers under the influence of the heat transferred thereto from the warming jacket, the valve 53 will close and the valve 54 will open so that the oil entering inlet 48 will follow a path through the radiator 52, outlet 55, conduit 56, and thence into the reservoir 43. This latter circuit or flow path will be maintained so long as the viscosity of the oil is at a point where the latter will readily flow at a predetermined pressure.

Referring to the operation of the entire lubrication system with the by-pass control valve included therein ahead of the heat exchange unit, as shown diagrammatically in Fig. 1, if the engine is put in operation with the oil in the system and radiator 51 either congealed or in a highly viscous state, the oil from the engine is forced under pressure by the scavenge pump (not shown) through conduit 45 and inlet 2 of the by-pass control valve.

In describing the operation of the various parts within the body of the fluid control device 1, the conditions of a typical starting sequence will be assumed wherein the oil within the radiator 51 and the conduit 46 leading to the reservoir 43 is either congealed or in a highly viscous condition.

Under the foregoing conditions, oil drawn from the engine (not shown) by the scavenge pump (also not shown) is forced into the valve body 1 through inlet 2. The oil under pressure entering the by-pass control valve body through the inlet 2 flows toward the by-pass opening 6 of the valve through the opening in the annular or ring valve 35 and tends to force congealed oil out of the conduit 46 and thereby establish flow from the bypass relief valve to the tank 43. At the same time, oil under pressure entering the inlet 2 of the by-pass relief valve acts in a downward direction on the top of valve 30 between the inlet 2 and outlet 3 of the by-pass control valve, exerting a force which, in conjunction with the spring 34 tends to hold the valve 30 in closed position. These forces tending to hold the valve 30 closed are augmented by fluid pressure at the outlet 6 of the valve created by the scavenge pump and resistance to flow through the conduit 46 acting on the top of the piston in the cylinder 17 through the passages 13 and 19.

Oil under pressure in the inlet 2 of the by-pass valve, simultaneously with its effect on the top of the valve 30 and the top of the piston in the cylinder 17 to hold the valve 30 closed as just described, enters the screened opening 27 to the friction tube 26 in the stem or rod 23 and moves through the friction tube and the openings 29 to the under side of the piston in the cylinder 17 to exert upward force on the piston. The friction tube 26 acts to delay exertion of full inlet pressure on the under side of the piston in the cylinder 17 and movement of the piston upwardly to open the valve 30, and further delay in opening of the valve 30 is provided for by the space between the lower side of the valve 30 and the nut 31 so that initial upward movement of the piston in the cylinder 17 which is against only the biasing effect of the spring 34 and the fluid pressure on the top of the piston in the cylinder 17 serves only to move the nut 31 upwardly against the under side of the valve 30 to set the parts for opening of the valve 30 by further upward movement of such piston. When the parts are in set position as just described, opening of the valve 30 is resisted by the combined effects of the spring 34, fluid inlet pressure on top of the valve 30 and fluid pressure on top of the piston in the cylinder 17.

Movement of such piston and the stem 23 upwardly also moves the disc valve 32 which rests on the shoulder 24 upwardly, and such upward movement of the disc valve 32 restricts the flow passage through the opening in the annular or ring valve 32. The oil flowing through the by-pass control valve, having become increasingly warmer in temperature and less in viscosity, flows with increased velocity, and such oil flowing at such higher velocity impinges on the under side of the disc valve 32 and moves such valve further upwardly and, the velocity plus the pressure built up in the inlet 2 as a result of the opening in the annular or ring valve 32 being restricted, finally moves the disc valve 32 into position to fully close the opening in the annular or ring valve.

With the disc valve 30 moved upwardly to close the opening in the annular or ring valve 35 as just described, pressure of the oil generated by the scavenge pump will build up in the inlet 2 until such pressure is sufficiently high to overcome the biasing effect of the spring 37 on the annular or ring valve 35 which is now in effect a solid valve, and such increased pressure in the inlet 2 is effective on the top of valve 30 to hold such valve closed.

The resistance value of the spring 37 creates and determines the pressure differential between the oil in the inlet 2 and the oil in the by-pass outlet 6, with pressure being less on the outlet side of the valve port 7 than on the inlet side thereof. Assuming the inlet pressure to be greater than the resistance value of the spring 37 and the valve 35 open, oil flowing from the inlet 2 to the by-pass outlet 6 will flow through the conduit 46 to the tank 43, first forcing any congealed oil out of the conduit 46, and oil pressure in the by-pass outlet 6 created by the scavenge pump and resistance to flow through the conduit 46 will be effective through the passages and grooves 13 and 19 on the top of the piston in the cylinder 17. Such latter pressure augments the downward pressure of the oil in the inlet 2 on the top of the valve 30 to hold such valve closed and protect the heat exchange unit 50 from damage resulting from high pressure which might otherwise escape through the main outlet 3 of the by-pass control valve. The areas of the piston in the cylinder 17 and the top of the valve 30 are such that with any appreciable pressure in the by-pass, the resistance to opening of the valve 30 is greater than the lifting effect of inlet pressure on the under side of the piston in the cylinder 17 through the friction tube 26 to open such valve 30.

As the temperature of the oil flowing through the by-pass valve rises due to heat imparted to the oil by the engine, the viscosity thereof and the resistance to flow through the conduit 46 decrease accordingly. At the same time the inlet pressure will likewise decrease, although there tending constantly to urge said second valve toward an open position, and means operable by the difference between the pressure of the fluid in said inlet and in said by-pass outlet to open said first valve and thereby establish communication between said inlet and said main outlet.

6. A valve of the character described comprising a casing having a side inlet, a side by-pass outlet, a main outlet at one end, a cylinder at its other end, a piston in said cylinder, an inwardly opening outwardly closing first valve normally closing said main outlet, a stem connecting said piston with said first valve, said stem having a duct therein affording communication between said inlet and the inner end of said cylinder, means providing communication between said by-pass outlet and the outer end of said cylinder, a ring valve between said inlet and said by-pass outlet closing toward said inlet, yieldable means maintaining said ring valve normally closed, a third valve at the inlet side of said ring valve normally spaced therefrom and movable toward a position closing the same against flow of fluid therethrough by flow of fluid from said inlet through said ring valve to said by-pass outlet, thereby to cause a reduced pressure of the fluid in said by-pass outlet and in the outer end of said cylinder as compared with the pressure of the fluid in said inlet and in the inner end of said cylinder with consequent outward movement of said piston and opening of said first valve, and yieldable means tending constantly to move said third valve to a position spaced from and open with respect to said ring valve.

7. A valve of the character described comprising a casing having a side inlet, a side by-pass outlet, a main outlet at one end, a cylinder at its other end, a piston in said cylinder, an inwardly opening outwardly closing first valve normally closing said main outlet, a stem connecting said piston with said first valve, said stem having a duct therein affording communication between said inlet and the inner end of said cylinder, means providing communication between said by-pass outlet and the outer end of said cylinder, a ring valve between said inlet and said by-pass outlet closing toward said inlet, yieldable means maintaining said ring valve normally closed, a third valve at the inlet side of said ring valve normally spaced therefrom and movable toward a position closing the same against flow of fluid therethrough by flow of fluid from said inlet through said ring valve to said by-pass outlet, thereby to cause a reduced pressure of the fluid in said by-pass outlet and in the outer end of said cylinder as compared with the pressure of the fluid in said inlet and in the inner end of said cylinder with consequent outward movement of said piston and opening of said first valve, said third valve being slidably mounted on said stem, said stem having a shoulder limiting sliding movement of said third valve thereon toward said first valve, and yieldable means tending constantly to slide said third valve on said stem to a position spaced from and open with respect to said ring valve and against said shoulder and thereby tending constantly to urge said first valve closed.

8. A fluid flow control device for use in a fluid circulatory system wherein a fluid, the viscosity of which varies with changes in temperature, is circulated under pressure, including a casing having an inlet, an outlet and a by-pass, all of which are interconnected, a valve normally biased to closed position between the inlet and the outlet of the device, and means associated with said valve and responsive to the pressure in the inlet and the flow velocity of the fluid to open said valve when the inlet pressure has decreased to less than a predetermined value.

9. A fluid flow control device for use in a fluid circulator system wherein a fluid, the viscosity of which varies with changes in temperature, is circulated under pressure, including a casing having an inlet, an outlet and a by-pass, all of which are interconnected, a valve normally biased to closed position between the inlet and the outlet of the device, and means including a time delay means associated with said valve and responsive to the pressure in the inlet and the flow velocity of the fluid to open said valve when the inlet pressure has decreased to less than a predetermined value.

10. A fluid flow control device including a casing having an inlet, an outlet and a by-pass, all of which are interconnected, a valve normally biased to closed position between the inlet and the outlet, and means associated with said valve and responsive to the pressure in the inlet and the flow velocity of the fluid to open said valve when the inlet pressure has decreased to less than a predetermined value.

11. A fluid flow control device including a casing having an inlet, an outlet and a by-pass, all of which are interconnected, means for creating a pressure differential between the inlet and the by-pass, a valve normally biased to closed position between the inlet and the outlet, and means associated with said valve and responsive to the pressure differential between the inlet and the by-pass, the pressure in the inlet and flow velocity of the fluid to open said valve when the inlet pressure has decreased to less than a predetermined value.

12. A fluid flow device for fluids, the viscosity of which varies with temperature change, including a casing having an inlet, an outlet and a by-pass all of which are interconnected, control means normally biased to closed position between the inlet and by-pass and effective to create a differential between inlet and by-pass pressure, said control means being adapted to permit flow through the by-pass when the pressure differential between the inlet and by-pass reaches a predetermined value and to prevent flow through the by-pass when the pressure differential between inlet and by-pass is below said predetermined value, second fluid pressure responsive control means disposed between the inlet and outlet and normally biased to closed position, and means associated with the last named control means responsive to the pressures in the inlet and the by-pass and the flow velocity of the fluid and effective to operate said second control means whereby to permit flow of fluid through the outlet when the differential between the inlet and the by-pass pressures and the pressure in the inlet have decreased to predetermined values.

13. A fluid flow control device of the character described including a casing having an inlet for connection to a scavenge pump, an outlet for connection to a heat exchanger and a by-pass outlet for connection to a reservoir, the inlet, outlet and by-pass being interconnected for the passage of fluid therethrough, a valve normally biased to closed position between the inlet and by-pass and effective to create a differential between inlet and by-pass pressure, a second fluid pressure operated valve disposed between the inlet and outlet and normally biased to closed position, and means associated with said second valve and responsive to the pressure in the inlet and the by-pass and the flow velocity of the fluid so as to open the latter valve and permit the first valve to close when the differential between the inlet and the by-pass pressures and the pressure in the inlet have decreased to predetermined values.

14. A fluid flow control device of the character described including a casing having an inlet passage for connection to a scavenge pump, a main outlet passage for connection to a heat exchanger and a by-pass outlet for connection to a reservoir, all of said passages being interconnected for the passage of fluid therethrough, a fluid pressure operated control means normally biased to closed position between the inlet and by-pass passages and adapted to open when the pressure of the fluid in the inlet exceeds a predetermined value, said control means being effective to create a differential between inlet and by-pass pressures, a second fluid pressure operated control means disposed in the passage between the inlet and main outlet passages and normally biased to closed position, and means associated with said second control means effective to operate said second control means in response to the pressures in the inlet and the by-pass, the flow velocity of the fluid and the viscosity of the fluid so as to permit flow through the outlet when the differential between the inlet and the by-pass pressures and the viscosity of the fluid have decreased to predetermined values.

15. A fluid flow control device including a casing having an inlet, an outlet and a by-pass all of which are interconnected; a valve assembly intermediate said inlet and said by-pass and operative in response to a rising flow velocity of the fluid between said inlet and said by-pass to cut off communication between said inlet and by-pass; yielding means controlling said valve assembly and permitting opening thereof to establish communication between said inlet and said by-pass when the pressure differential therebetween attains a predetermined value; a valve intermediate the inlet and outlet and movable to open and close said outlet; and means responsive to a decreasing fluid pressure at said inlet and to the pressure differential between said inlet and said by-pass for opening said outlet control valve.

HAROLD CRUZAN.